Figure 1:
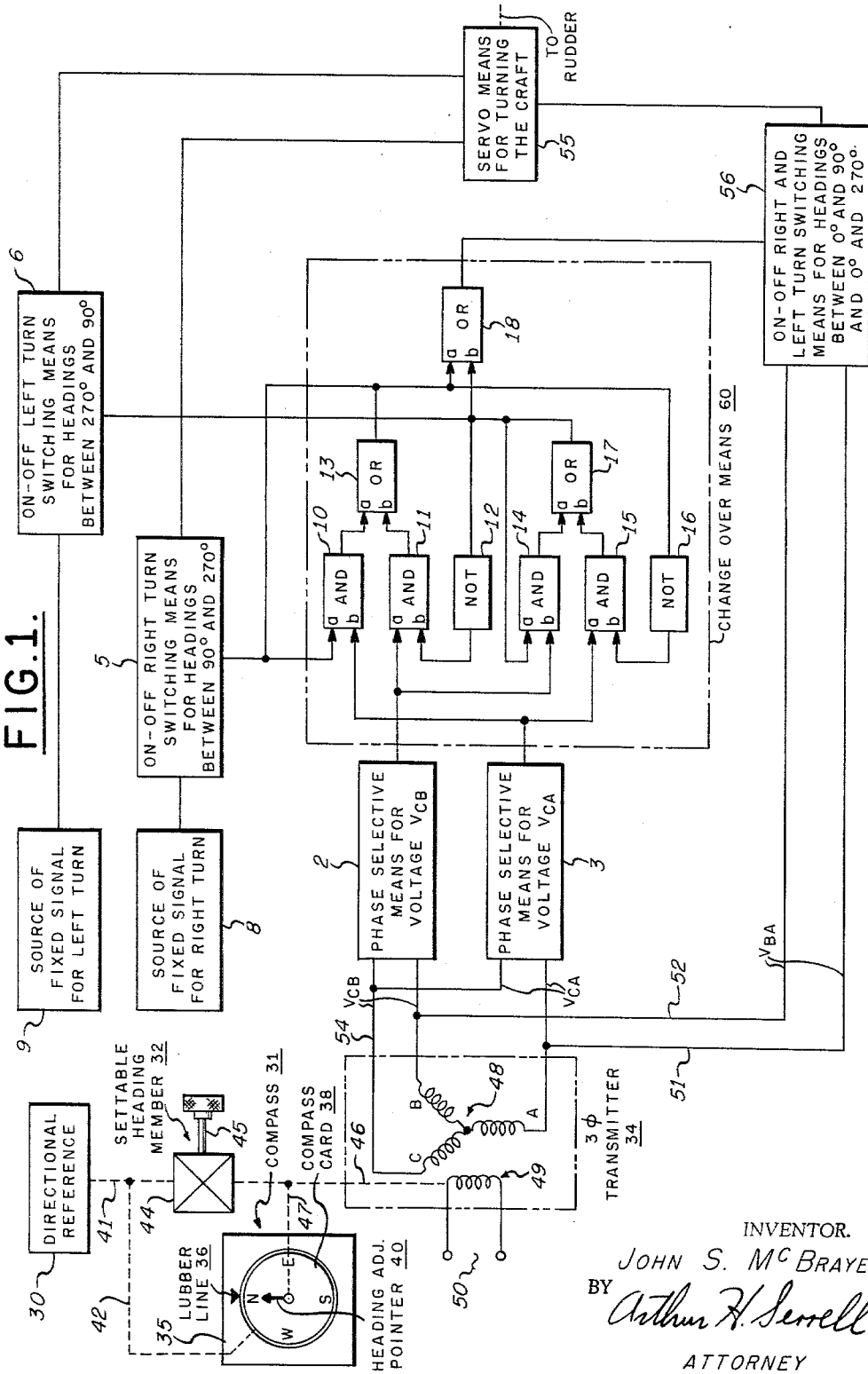

May 3, 1966  J. S. McBRAYER  3,249,080
TURN CONTROL SYSTEM
Filed March 9, 1965  3 Sheets-Sheet 1

INVENTOR.
JOHN S. McBRAYER
BY Arthur H. Serrell
ATTORNEY

May 3, 1966     J. S. McBRAYER     3,249,080

TURN CONTROL SYSTEM

Filed March 9, 1965     3 Sheets—Sheet 2

FIG. 2

NO INPUT – 0    NO OUTPUT – 0
INPUT – 1    OUTPUT – 1

| TURNS FROM NORTH TO HEADINGS IN THE NOTED COMPASS RANGE | | PHASE SENSITIVE CIRCUITS | | CHANGE OVER MEANS | | | | | | | | | | | | | | | | | | | | | | | | | SWITCHING MEANS | | |
|---|---|---|---|---|---|---|---|---|---|---|---|---|---|---|---|---|---|---|---|---|---|---|---|---|---|---|---|---|---|---|---|
| | | 2 | 3 | AND 10 | | | AND 11 | | | NOT 12 | | AND 14 | | | AND 15 | | | NOT 16 | | OR 13 | | | OR 17 | | | OR 18 | | | 5 | 6 | 56 |
| SENSE | COMPASS | OUT | OUT | a | b | OUT | a | b | OUT | IN | OUT | a | b | OUT | a | b | OUT | IN | OUT | a | b | OUT | a | b | OUT | a | b | OUT | | | |
| RIGHT | 0° TO 90° | 0 | 0 | 0 | 0 | 0 | 0 | 1 | 0 | 0 | 1 | 0 | 0 | 0 | 0 | 1 | 0 | 0 | 1 | 0 | 0 | 0 | 0 | 0 | 0 | 0 | 0 | 0 | | | CLOSED |
| LEFT | 0° TO 270° | 0 | 0 | 0 | 0 | 0 | 0 | 1 | 1 | 0 | 1 | 0 | 0 | 0 | 0 | 1 | 0 | 0 | 1 | 0 | 0 | 0 | 0 | 0 | 0 | 0 | 0 | 0 | OPEN | OPEN | CLOSED |
| RIGHT | 90° TO 150° | 1 | 0 | 1 | 0 | 0 | 0 | 1 | 1 | 0 | 1 | 0 | 0 | 0 | 0 | 0 | 0 | 1 | 0 | 1 | 0 | 1 | 0 | 0 | 0 | 1 | 0 | 1 | CLOSED | OPEN | OPEN |
| LEFT | 270° TO 210° | 0 | 1 | 0 | 1 | 0 | 0 | 0 | 0 | 1 | 0 | 0 | 1 | 0 | 1 | 1 | 1 | 0 | 1 | 0 | 0 | 0 | 0 | 1 | 1 | 0 | 1 | 1 | OPEN | CLOSED | OPEN |
| RIGHT | 150° TO 210° | 1 | 1 | 1 | 1 | 1 | 1 | 1 | 1 | 1 | 0 | 1 | 0 | 0 | 1 | 1 | 0 | 1 | 0 | 1 | 1 | 0 | 1 | 0 | 1 | 1 | 0 | 1 | CLOSED | OPEN | OPEN |
| LEFT | 210° TO 150° | 1 | 1 | 1 | 1 | 1 | 1 | 1 | 1 | 1 | 0 | 1 | 1 | 0 | 1 | 1 | 0 | 1 | 0 | 1 | 0 | 0 | 0 | 1 | 1 | 0 | 1 | 1 | OPEN | CLOSED | OPEN |
| RIGHT | 210° TO 270° | 0 | 1 | 0 | 1 | 0 | 0 | 1 | 0 | 1 | 0 | 0 | 1 | 0 | 1 | 0 | 1 | 0 | 0 | 0 | 1 | 0 | 1 | 0 | 0 | 1 | 0 | 1 | CLOSED | OPEN | OPEN |
| LEFT | 150° TO 90° | 1 | 0 | 0 | 0 | 0 | 0 | 0 | 1 | 0 | 1 | 1 | 1 | 1 | 0 | 1 | 0 | 1 | 0 | 0 | 0 | 0 | 1 | 0 | 1 | 0 | 1 | 1 | OPEN | CLOSED | OPEN |

INVENTOR
JOHN S. McBRAYER
BY Arthur H. Serrell
ATTORNEY

United States Patent Office 3,249,080
Patented May 3, 1966

3,249,080
TURN CONTROL SYSTEM
John S. McBrayer, Phoenix, Ariz., assignor to Sperry Rand Corporation, Great Neck, N.Y., a corporation of Delaware
Filed Mar. 9, 1965, Ser. No. 438,257
11 Claims. (Cl. 114—144)

This invention relates to a system for turning a craft automatically to an ordered heading in one of three complementary compass ranges without ambiguity through angles up to 270°.

In known turn control systems with a three phase transmitter connected to an order member and to a craft, the output of the transmitter is a voltage whose amplitude is proportional to the sine of the angular displacement between the actual and selected headings of the craft while the phase of the voltage depends on the sense of the turn, a right turn being of one phase and a left turn being of the opposite phase. The turn order is further limited angularly in order to prevent the craft from turning above a desired rate at a point midway of the turn. One problem encountered is that for turns through an angle of more than 180° there is possible ambiguity in the output voltage of the transmitter (i.e. sine 10°=sine 170°, sine 20°=sine 160°, sine 35°=sine 145° etc.). The operational range of such a system is further necessarily limited to less than 180° due to the fact that the voltage of the transmitter goes to null as the phase reverses to change the sense of the turn. To prevent turn reversals as well as control the turn rate in such known systems, the turns up to 180° and above were executed in steps where each swing was determined by limiting the angular displacement of the order member as desired by the human pilot.

The primary object of the present invention is to provide a system that operates without ambiguity to automatically turn a craft in a single step through an angular range up to 270° in either a right or left hand sense.

In accordance with the invention, the improved system includes a three phase transmitter or synchro with a part differentially connected to an angularly adjustable member, means for turning the craft, a circuit between each of the phases of the transmitter and the turning means each of which includes switching means, and changeover means for opening and closing the switching means of the circuits so that the system operates with one of the circuits closed and two of the circuits open depending on the heading of the craft and the adjusted setting of the order member.

Another feature of the invention resides in the provision in the improved system with a three phase transmitter of two circuits that include phase selective means therein, means responsive to the output of the phase selective means in one of the circuits for turning the craft in a determined angular range, and means responsive to the output of the phase selective means in the other of the circuits for turning the craft in a determined angular range.

Figure 3:
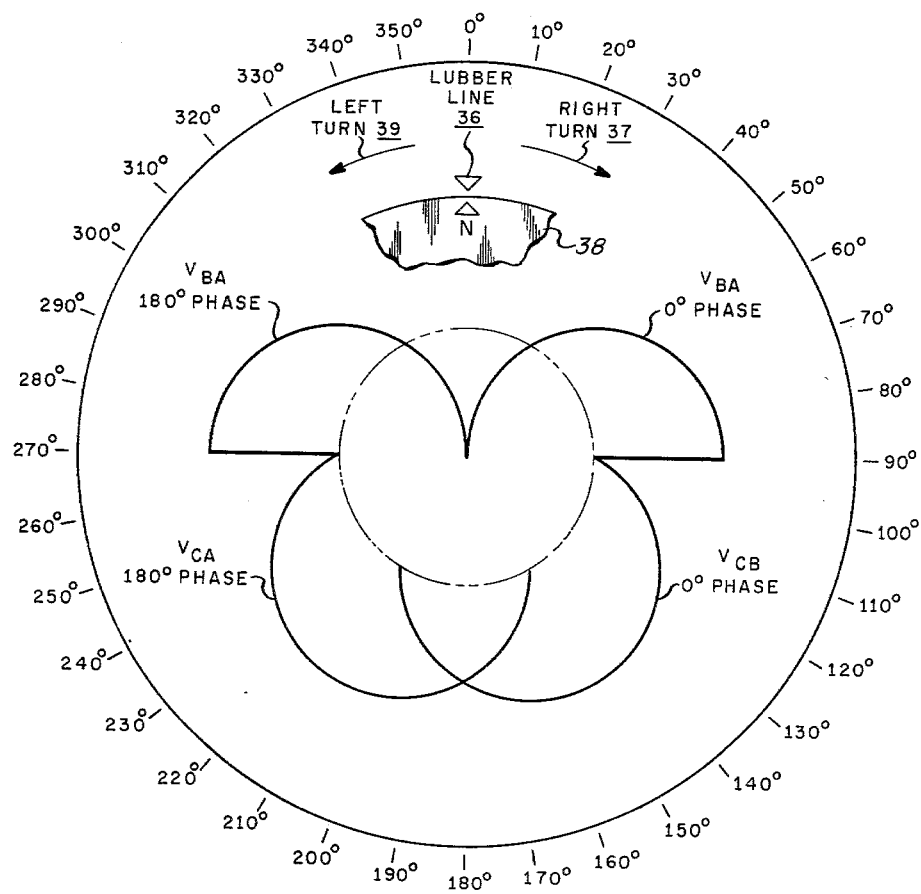

Further objects, features and structural details of the present invention will be apparent from the following description when read in relation to the accompanying drawings wherein:

FIG. 1 is a schematic view and circuit diagram of a craft steering system constructed in accordance with the present invention, FIG. 2 is a table showing the operational condition of the components of the improved system with regard to turns from North to headings in eight compass ranges where the components are designed as phase sensitive circuits, changeover means and switching means, and FIG. 3 is a polar graph of the output voltage of the three phase transmitter or synchro of the improved system.

To measure the displacement angle between actual craft heading and ordered craft heading electrically, the improved turn control system includes a directional reference 30, a compass 31, a manually settable heading member 32, and a three phase transmitter or synchro 34. The compass 31 includes a suitable housing 35 and a lubber line 36 that moves in a clockwise sense in right hand turns as indicated by arrow 37 in FIG. 3 with respect to a compass card 38. Both the housing 35 and line 36 move in a counterclockwise sense as indicated by arrow 39 in FIG. 3 with left hand turns of the craft. The card 38 of the compass 31 includes conventional heading indicia which with a heading adjusting pointer 40, and card 38 in FIG. 3, indicates to the human pilot that the ordered heading is North and that the craft is on the North heading. Connected shafting 41 and 42 stabilizes the card 38 from the reference 10 with respect to the craft. The turn order means of the improved system includes a differential 44 with an input end connected to reference 30 by shafting 4 and an input end connected to member 32 by shafting 45. The output end of the differential 44 is connected by shafting 46 to the rotor part of the three phase transmitter or synchro 34. Shafting 47 connects the output end of differential 44 to the adjustable pointer 40 by way of connecting shafting 46. In the improved system, the human pilot by adjustment of member 32 is able to displace pointer 40 and the rotor of synchro 34 up to a 270° angle with respect to the compass card 38. For right hand turns, the manual member 32 is adjusted to move pointer 40 in a clockwise direction in FIG. 1 to the heading ordered within the range of the system. To set the system so that the craft is turned automatically from a North to a South heading, the pointer 40 is moved through 180° to a South position on the compass card 38. For left turns, the member 32 is operated in an opposite sense so that the pointer 40 moves in a counterclockwise sense with respect to the card 38. In the improved system, synchro 34 includes a three phase wound stator part 48 fixed to the craft and a wound rotor part 49 that moves angularly with respect to the stator part depending on the angular displacement of the pointer 40 with respect to card 38 for a particular heading change order. Rotor part 49 of the transmitter 34 is connected differentially to the settable member 32 and the directional reference 30. The synchro 34 is energized by a connection between the wound rotor part 49 and a suitable source of alternating current 50 so that for a particular angular relation of the parts and heading of the craft one phase of the three phase winding produces an output voltage $V_{BA}$ across lead 51 and 52 to terminals A and B respectively, the second phase of the winding produces an output voltage $V_{CB}$ across lead 52 and lead 54 to terminals B and A respectively, and the third phase of the winding produces an output voltage $V_{CA}$ across leads 54 and 51 to terminals C and A respectively. The effective output of the system depends on the heading of the craft at the start of the turn and the angular adjustment of the pointer 40. Where, for example, the turn starts from a North heading as shown in FIGS. 1 and 3 and the pointer 40 is moved clockwise with respect to the card to a South position with an angular displacement of the synchro rotor part 49 with respect to stator part 48 of 180° by the adjustment of member 32, the system operates to move the craft in a right turn until the lubber line 36 is adjacent to South indicia on the card indicating the completion of the ordered turn.

The improved system provides respective compass ranges for each phase of the output of synchro 34 that complement one another as shown by the connecting curves of FIG. 2 that relate the output of the synchro 34 to the compass card 38 and the heading of the craft. Here output voltage $V_{BA}$ of 0° phase for right turns and 180° phase for left turns provides a compass range from 0° to 90° and from 0° to 270°. A second compass range is provided by the output voltage $V_{CB}$ of 0° phase between 90° and 210° in right turns. The third compass range is provided by the output voltage $V_{CA}$ of 180° phase between 270° and 150° in left turns. In the turn described by way of example with respect to FIGS. 1 and 3, the transmitter output $V_{BA}$ of 0° phase operates a servo means 55 for turning the craft by way of an on-off, right and left turn switching means for heading between 0° and 90° and 0° and 270° as indicated at 56. For the compass range considered, the switching means 56 is on, conditioned to close the circuit between synchro 34 and servo means 55 until the craft with its lubber line 36 has moved in the direction of arrow 37 to the 90° compass heading. At this point in the turn the switching is rendered in an off condition so that the system now comes under the influence of the phase of the synchro producing the output voltage $V_{CB}$.

To control the craft in turns outside of the range provided by the output voltage $V_{BA}$, the system includes a phase selective means 2 for the output voltage $V_{CB}$, a phase selective means 3 for the output voltage $V_{CA}$, an off-on left turn switching means 6 for headings between 270° and 90°, an off-on right turn switching means 5 for headings between 90° and 270°, a source of fixed signal for right turns 8, and a source of fixed signal for left turns 9. Turn source 8 is connected to the servo means 55 by way of switching means 5. Turn source 9 is connected to servo means 55 by way of switching means 6. The improved system further includes a changeover means 60 that connects the phase selective means 2, 3 to the switching means 5, 6, 56 so that one of the circuits to the servo means is open while the other two are closed. The changeover means controls the operation of the respective switching means as the craft goes from one of its compass ranges to another as detected by the phase selective means 2 and phase selective means 3. As shown in FIG. 1, means 60 includes AND elements 10, 11, 14, 15; OR elements 13, 17, 18 and NOT elements 12, 16 of known character. The AND elements require two input voltages above a specific level to produce an output voltage. The OR elements produce an output voltage when they receive either one input voltage or two input voltages. The NOT elements produce an output with a null input and produces a null output when receiving an input. The means 60 combines the outputs of the selective means 2 and selective means 3 so that as shown in FIG. 2 there is no output from the OR elements 13, 17 and 18 in the compass range 0° to 90° and 0° to 270°. The normally open switching means 5 and normally open switching means 6 break the circuits between sources 8 and 9 to the servo means 55 in this range. The normally closed switching means 56 of the system connects synchro 34 to the servo means 55 for the compass ranges noted.

In the considered right turn from a North to a South heading at the heading East, the output voltage $V_{CB}$ from transmitter or synchro 34 passes the phase selective means 2 to be received by the AND elements 11 and 14 of the means 60. As NOT element 12 of the means 60 also produces an input to AND element 11 in the range of 90° to 150°, the element 11 provides an input to the OR elements 13 and 18. The output of element 13 closes the switching means 5 between source 8 and servo means 55 so that the right turn of the craft continues when the East heading is reached. The output of the OR element 18 simultaneously turns the switching means 56 off to open the $V_{BA}$ circuit to the servo means. As the turn continues to 150°, the phase selective means 3 passes output voltage $V_{CA}$ to provide an input to the AND elements 10 and 15 of the means 60. Here, the OR element 13 also provides an output to the AND element 10 in the range 150° to 210° to maintain the condition of the switching means 5 and 56. For the considered turn, the output of the synchro goes to null at the 180° or South heading of the craft to automatically null the output of the elements 13 and 18 so that the switching means are restored to normal condition with means 56 on and means 5 open. The NOT element 16 and OR element 17 of the means 60 provide equivalent components to NOT element 12 and OR element 13 for the control of the switching means 6 to on conditions in the compass ranges for left hand turns shown in FIG. 2 to be 270° to 210°, 210° to 150° and 150° to 90°. In right turns, switching means 5 is also closed in the compass range 210° to 270°. As further shown in FIG. 2, the switching means 56 remains open during turns outside of the range 0° to 90° and 0° to 270°. The improved system includes means responsive to the outputs of the phase selective circuits for moving the craft in a right turn through a determined range of 90° to 270° and for moving the craft in a left turn through a determined range of 270° to 90°. The improved system operates without ambiguity to make the necessary changeover operations as the craft swings from one compass range to another to reach an ordered heading from any initial heading within 270° thereof by a single setting of the pointer 40. This result is accomplished by ambiguity displacing the wound rotor part 49 of the synchro 34 with relation to the stator part 48 through adjustment of the member 32 and the connecting differential 44 and shafting 46. The system then operates to turn the craft so that the stator part 48 turns with relation to rotor part 49 until the displacement therebetween is null and the output of the synchro or transmitter 34 is also null. FIG. 2 shows the operative condition of all of the components of the system with the craft's heading within the ranges noted where the sense of the turn is also indicated.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A system for turning a craft automatically to an ordered heading in one of three complementing compass ranges including a directional reference, means for ordering a change in the heading of the craft having a manually settable member, an alternating current power source, a three phase transmitter energized by the source having a part fixed to turn with the craft, a part connected differentially to the reference and the manually settable member, and an output depending on the angular relation of the parts, servo means operable to turn the craft with respect to the reference, a first compass range circuit between one output phase of the transmitter and the servo turning means including first switching means, means for providing a right turn output, a second compass range circuit between the right turn output means and servo turning means including second switching means, means for providing a left turn output, a third compass range circuit between the left turn output means and servo turning means including third switching means, and changeover means depending on the setting of the heading change member and the change in heading of the craft for closing the switching means of one of the compass range circuits and for opening the switching means of the other two of the compass range circuits including first and second phase selective circuits for the other two of the output phases of the transmitter, and a circuit between the respective phase selective circuits and the first, second and third switching means.

2. A system of the character claimed in claim 1, in which the range of the first circuit is between 0 and 90 degrees and 0 and 270 degrees, the range of the second circuit is between 90 and 270 degrees, and the range of the third circuit is between 270 and 90 degrees.

3. In a system for turning a craft automatically, a heading reference including a compass, heading order changing means having a manually settable member movable with relation to the compass in one sense for a right hand turn and in an opposite sense for a left hand turn, an alternating current power source, a three phase synchro energized by the source having a part fixed to turn with the craft, a part set by the member, and an output depending on the angular relation of the parts, a phase selective circuit for one of the output phases of the synchro, a phase selective circuit for another of the output phases of the synchro, means responsive to the phase selective circuits for providing a right turn of the craft through a determined first compass range, means responsive to the phase selective circuits for providing a left turn of the craft through a determined second compass range, and means responsive to the third output phase of the synchro for turning the craft through a determined third compass range.

4. A system of the character claimed in claim 3, in which the right turn responsive means operates in a compass range between 90 and 270 degrees, the left turn responsive means operates in a compass range between 270 and 90 degrees, and in which the third turn responsive means operates in a compass range between 0 and 90 degrees and 0 and 270 degrees.

5. A system for steering maneuverable craft including a compass having a card, a turn order means with a member adjustable angularly in relation to the compass card, a three phase synchro having a part fixed to the craft and a part differentially connected to the compass and member, servo means operable to turn the craft, a first circuit between the servo means and one of the phases of the synchro including switching means, a second circuit between the servo means and another of the phases of the synchro including switching means, a third circuit between the servo means and the third of the phases of the synchro including switching means, and changeover means for opening and closing the switching means of the circuits so that the system operates with one of the circuits closed and two of the circuits open depending on the heading of the craft and the adjustment of the order member.

6. A system of the character claimed in claim 5, in which the one of the circuits includes phase sensitive means, and means responsive to the phase sensitive means for closing the switching means to turn the craft in one direction, and another of the circuits includes phase sensitive means, and means responsive to the phase sensitive means for closing the switching means to turn the craft in the other direction.

7. A system of the character claimed in claim 6, in which the switching means of the remaining circuit is opened by the output of phase sensitive means of the one and another circuits.

8. In a craft steering system, a directional reference, a heading order member, a three phase synchro having a part fixed to the craft, a part differentially connected to the reference and member, and an output depending on the angular relation of the parts, a circuit for one of the output phases of the synchro including phase selective means, a circuit for another of the output phases of the synchro including phase selective means, and means responsive to outputs of the phase selective circuits for turning the craft in one direction through a determined first angular range and for turning the craft in the other direction through a determined second angular range.

9. A system of the character claimed in claim 8, including a circuit for the third of the output phases of the synchro, and means responsive to the output of the third phase of the synchro for turning the craft in a determined third angular range.

10. A system of the character claimed in claim 9, in which the first angular range is between 90 degrees and 270 degrees, the second angular range is between 270 degrees and 90 degrees, and the third angular range is between 0 degrees and 90 degrees, and 0 degrees and 270 degrees.

11. In a steering system for changing the heading of a maneuverable craft, servo means for turning the craft, an electrical source, a three phase transmitter energized by the source having a part fixed to the craft and a rotor part, means operatively connected to the rotor part to change the heading of the craft, switching means between one of the phases of the transmitter and the servo means, a source of fixed signal for right hand turns of the craft, switching means between the right hand turn signal means and the servo means, a source of fixed signal for left hand turns of the craft, switching means between the left hand turn signal means and the servo means, and means depending on the heading of the craft and the output of the other pases of the transmitter for operating the switching means as the craft swings from a determined angular range to another determined angular range to provide a single input to the servo means.

No references cited.

MILTON BUCHLER, *Primary Examiner.*

A. H. FARRELL, *Assistant Examiner.*